US012744661B2

(12) United States Patent
Liu

(10) Patent No.: US 12,744,661 B2
(45) Date of Patent: Sep. 22, 2026

(54) SECURELY SHARING DATA AND ACCESS PERMISSIONS IN A CLOUD ENVIRONMENT

(71) Applicant: Micron Technology, Inc., Boise, ID (US)

(72) Inventor: Zhan Liu, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 243 days.

(21) Appl. No.: 17/899,177

(22) Filed: Aug. 30, 2022

(65) Prior Publication Data

US 2024/0073001 A1 Feb. 29, 2024

(51) Int. Cl.
*H04L 9/08* (2006.01)
*H04L 9/32* (2006.01)

(52) U.S. Cl.
CPC .......... *H04L 9/0825* (2013.01); *H04L 9/3247* (2013.01); *H04L 9/3268* (2013.01)

(58) Field of Classification Search
CPC ... H04L 9/0825; H04L 9/3247; H04L 9/3268; H04L 9/083; H04L 9/0894
See application file for complete search history.

(56) References Cited

U.S. PATENT DOCUMENTS

2002/0080973 A1* 6/2002 Cromer .................. G06F 21/31 380/282
2015/0186668 A1* 7/2015 Whaley .............. G06F 16/2379 713/176
2019/0140848 A1* 5/2019 Dontov ................ H04L 9/3268
2020/0389869 A1* 12/2020 Patil ..................... H04W 48/16
2021/0167972 A1* 6/2021 Zang .................. H04L 63/0823
2021/0281420 A1* 9/2021 Szubbocsev .......... H04L 9/3247
2022/0116229 A1* 4/2022 Jones ................... H04L 9/3265
2022/0124078 A1* 4/2022 Erickson .............. H04L 9/0894
2022/0182222 A1* 6/2022 Wei ...................... H04L 9/0894
2022/0263655 A1* 8/2022 Murray .............. H04L 63/0823
2022/0385482 A1* 12/2022 Mozano ................. G06F 21/33
2023/0008976 A1* 1/2023 Xu ....................... H04L 9/3247
2023/0122665 A1* 4/2023 Pai ....................... H04L 9/0822 713/2
2023/0216662 A1* 7/2023 Chan .................... H04L 9/0822 713/171

* cited by examiner

*Primary Examiner* — Andrew Suh
(74) *Attorney, Agent, or Firm* — Greenberg Traurig

(57) ABSTRACT

In some aspects, the techniques described herein relate to a method including: transmitting, by a user device, a public key of a client device to a key management server (KMS); generating, by the KMS, a digital certificate using the public key of the client device; storing the digital certificate in a storage device of a cloud service; generating, by the client device, a signed command to access the storage device, the signed command signed using a private key corresponding to the public key of the client device; and issuing the signed command to the storage device to access data stored by the storage device.

20 Claims, 7 Drawing Sheets

SECURELY SHARING DATA AND ACCESS PERMISSIONS IN A CLOUD ENVIRONMENT

FIELD OF THE TECHNOLOGY

At least some embodiments disclosed herein relate generally to network storage devices and, in particular, to improvements in allowing secure shared access to data in such devices.

BACKGROUND

In existing network storage devices (used, for example, in providing cloud services), user data is frequently protected from access by unauthorized users. For example, a user's data stored in a cloud service is not accessible by other users without providing the proper credentials (e.g., a username and password). Such systems suffer from numerous drawbacks that prevent sharing of data among multiple users. First, a system administrator must grant access to other users by establishing the user credentials. Failure to do so prevents sharing data with others. Second, the system administrator must revoke access by revoking such credentials. Failure to do so results in leakage of data to previously authorized (but not unauthorized users). Third, for encrypted data, administrators may be able to access data. Fourth, user credentials may be compromised and used by malicious users.

DETAILED DESCRIPTION

Figure 1:
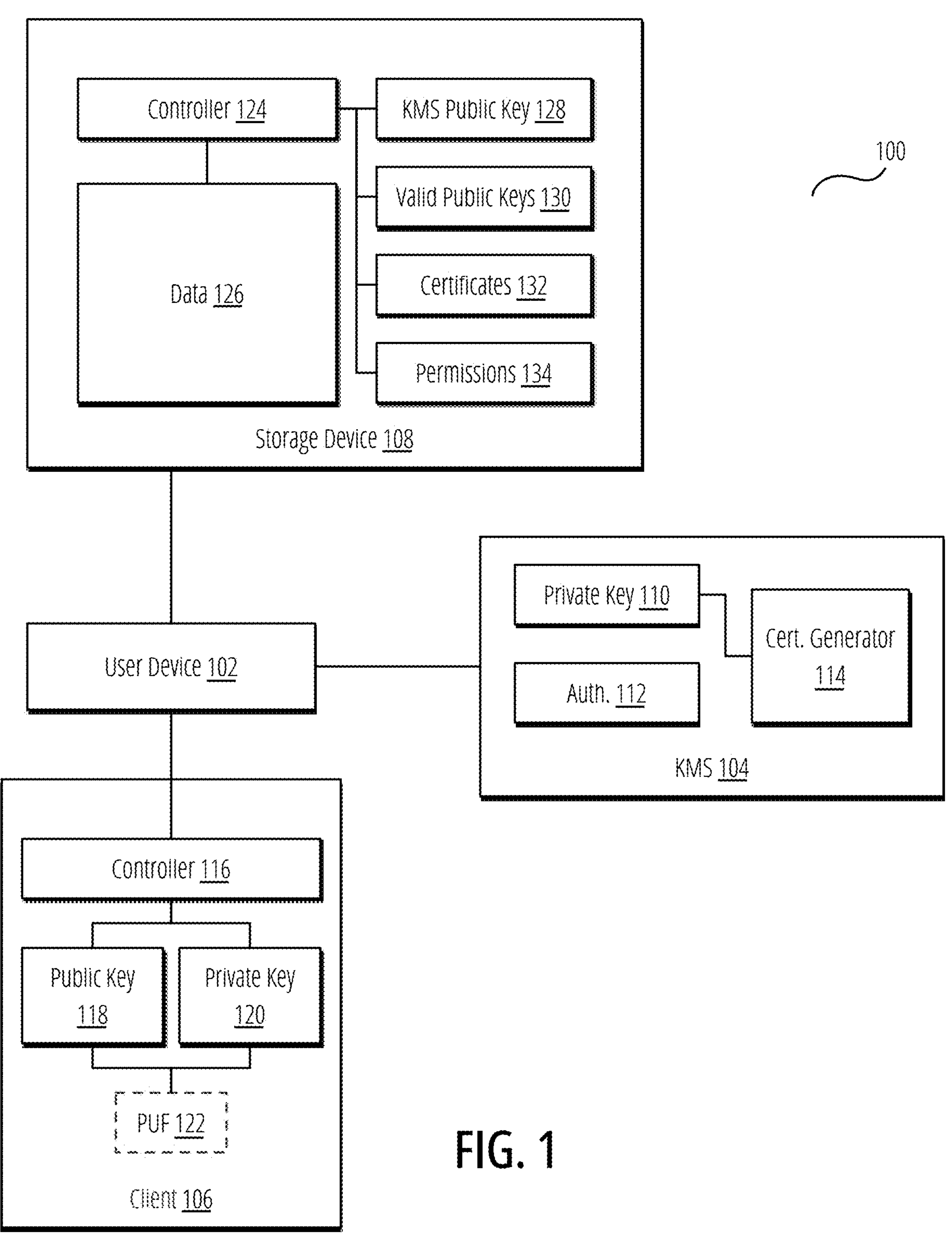
FIG. 1 is a block diagram illustrating a system for providing shared access to data in a cloud service.

To remedy the above provides, a system is provided that allows third-party devices of authorized users to access a user's data stored in a cloud storage device. The third-party can provide their public key to a user which can then, in turn, provide the public key to a key management server (KMS) which generates a certificate stored by the cloud storage device. Then, the authorized user can issue secure commands (signed with their private key) to the cloud storage device to access data.

In some aspects, the techniques described herein relate to a method including: transmitting, by a user device, a public key of a client device to a key management server (KMS); generating, by the KMS, a digital certificate using the public key of the client device; storing the digital certificate in a storage device of a cloud service; generating, by the client device, a signed command to access the storage device, the signed command signed using a private key corresponding to the public key of the client device; and issuing the signed command to the storage device to access data stored by the storage device.

In some aspects, the techniques described herein relate to a method, wherein generating a digital certificate using a public key of a client device includes generating, by the KMS, the digital certificate by using the public key of the client device as a Subject Public Key and signing the digital certificate using a KMS private key.

In some aspects, the techniques described herein relate to a method, wherein storing the digital certificate in a storage device of a cloud service includes: reading, by the storage device, a KMS public key stored in a write-protected region of the storage device; validating, by the storage device, the digital certificate using the KMS public key; and writing the public key of the client device to the write-protected region.

In some aspects, the techniques described herein relate to a method, wherein storing the digital certificate in a storage device of a cloud service further includes setting at least one access permission based on the digital certificate.

In some aspects, the techniques described herein relate to a method, wherein the digital certificate includes a validity period and the method further includes removing the digital certificate when the validity period expires.

In some aspects, the techniques described herein relate to a method, further including receiving, by the storage device, the signed command and validating the signed command by validating a digital signature included in the signed command using the public key included in the digital certificate.

In some aspects, the techniques described herein relate to a method, further including: returning, by the storage device, data responsive to the signed command; and processing, by the client device, the data.

In some aspects, the techniques described herein relate to a non-transitory computer-readable storage medium for tangibly storing computer program instructions capable of being executed by a computer processor, the computer program instructions defining steps of: transmitting, by a user device, a public key of a client device to a key management server (KMS); generating, by the KMS, a digital certificate using the public key of the client device; storing the digital certificate in a storage device of a cloud service; generating, by the client device, a signed command to access the storage device, the signed command signed using a private key corresponding to the public key of the client device; and issuing the signed command to the storage device to access data stored by the storage device.

In some aspects, the techniques described herein relate to a non-transitory computer-readable storage medium, wherein generating a digital certificate using a public key of a client device includes generating, by the KMS, the digital certificate by using the public key of the client device as a Subject Public Key and signing the digital certificate using a KMS private key.

In some aspects, the techniques described herein relate to a non-transitory computer-readable storage medium, wherein storing the digital certificate in a storage device of a cloud service includes: reading, by the storage device, a KMS public key stored in a write-protected region of the storage device; validating, by the storage device, the digital certificate using the KMS public key; and writing the public key of the client device to the write-protected region.

In some aspects, the techniques described herein relate to a non-transitory computer-readable storage medium, wherein storing the digital certificate in a storage device of a cloud service further includes setting at least one access permission based on the digital certificate.

In some aspects, the techniques described herein relate to a non-transitory computer-readable storage medium, wherein the digital certificate includes a validity period and the steps further include removing the digital certificate when the validity period expires.

In some aspects, the techniques described herein relate to a non-transitory computer-readable storage medium, further including receiving, by the storage device, the signed command and validating the signed command by validating a digital signature included in the signed command using the public key included in the digital certificate.

In some aspects, the techniques described herein relate to a non-transitory computer-readable storage medium, the steps further including: returning, by the storage device, data responsive to the signed command; and processing, by the client device, the data.

In some aspects, the techniques described herein relate to a system including: a key management server (KMS); a storage device; a client device associated with a public key; a user device, the user device having access to the storage device via a network, wherein the user device is configured to transmit the public key of the client device to the KMS, the KMS configured to generate a digital certificate using the public key of the client device in response to the public key of the client device, and store the digital certificate in a storage device of a cloud service; and wherein the client device is configured to: generate a signed command to access the storage device, the signed command signed using a private key corresponding to the public key of the client device; and issue the signed command to the storage device to access data stored by the storage device.

In some aspects, the techniques described herein relate to a system, the KMS is further configured to generate the digital certificate by using the public key of the client device as a Subject Public Key and signing the digital certificate using a KMS private key.

In some aspects, the techniques described herein relate to a system, wherein the storage device is further configured to: read a KMS public key stored in a write-protected region of the storage device; validate the digital certificate using the KMS public key; and write the public key of the client device to the write-protected region.

In some aspects, the techniques described herein relate to a system, wherein the storage device is further configured to set at least one access permission based on the digital certificate.

In some aspects, the techniques described herein relate to a system, wherein the digital certificate includes a validity period and the storage device is further configured to remove the digital certificate when the validity period expires.

In some aspects, the techniques described herein relate to a system, wherein the storage device is further configured to receive the signed command and validate the signed command by validating a digital signature included in the signed command using the public key included in the digital certificate.

FIG. 1 is a block diagram illustrating a system for providing shared access to data in a cloud service. The system 100 includes a user device 102, KMS 104, authorized client device 106, and storage device 108.

Figure 7:
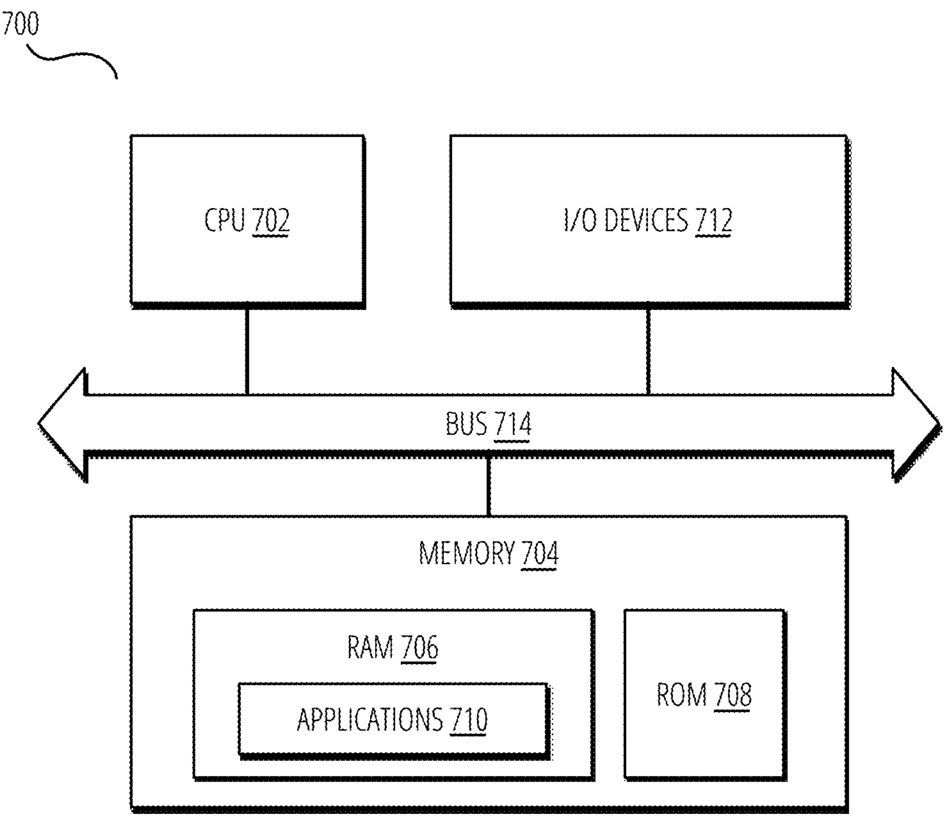
FIG. 7 is a block diagram of a computing device according to some embodiments of the disclosure.

In an implementation, the user device 102 and authorized client device 106 can both comprise a general-purpose computing device such as that depicted in FIG. 7 and the description of such hardware is not repeated herein. As illustrated, the user device 102 can communicate with KMS 104 to generate a digital certificate that identifies the public key 118 of the authorized client device 106 for later operations. Specific details of these operations are provided in more detail in the description of FIG. 2 which is not repeated herein. Then, authorized client device 106 can issue requests to access data in storage area 126 of storage device 108 by signing such commands with private key 120. Specific details of issuing such commands are provided in the description of FIGS. 4 and 5 and are also not repeated herein. As will be discussed, storage device 108 may be owned and operated by a cloud network operator (e.g., as part of a cloud service such as a cloud storage). As such, the communications between user device 102 or authorized client device 106 and the storage device 108 (and, indeed, the user device 102 and KMS 104) may be transmitted over a network such as a wide-area network (e.g., the Internet).

In some implementations, the KMS 104 may comprise a server or network of servers that provides key management operations for user device 102 and storage device 108. In some implementations, the KMS 104 can perform various key management operations not described herein for the sake of clarity. As illustrated, the KMS 104 can include authentication logic 112. In some implementations, the authentication logic 112 can authenticate requests from the user device 102. In some implementations, the authentication logic 112 can perform a user identifier (e.g., username, email, etc.) and password authentication to authenticate the user device 102. Alternatively, or in conjunction with the foregoing, the authentication logic 112 can implement a mutual transport layer security (mTLS) protocol to authenticate the user device 102. In general, any technique that can match a user device 102 to a known user (or user account) may be used. As illustrated, the KMS 104 includes a KMS private key 110. Certainly, the KMS 104 may own multiple such private keys. The KMS private key 110 may be a private key portion of an asymmetric key pair such as a Rivest-Shamir-Adleman (RSA) or Elliptic Curve Digital Signature Algorithm (ECDSA) key pair. The public key of such a key pair is not illustrated as being held by KMS 104 but may in fact be held by the KMS 104. In some implementations, the KMS private key 110 can be stored in a secure storage location such as a trusted execution environment (TEE), hardware security module (HSM), Secure Enclave, or similar type of secure storage mechanism. In some implementations, the KMS 104 can include multiple such KMS private keys for security purposes, although only one is illustrated for the sake of clarity. The KMS 104 also includes a certificate generator 114. In an implementation, the certificate generator 114 can generate a digital certificate such as an X.509-formatted digital certificate. In some implementations, the certificate generated by certificate generator 114 can include a public key provided by the user device 102 as the Subject Public Key in the Subject Public Key Info field of an X.509 certificate. In some implementations, the user device 102 may request and/or receive the public key 118 from authorized client device 106 and provide this public key 118 to the KMS 104 (and certificate generator 114) to generate a digital certificate for the public key 118. In some implementations, the digital certificate generated by certificate generator 114 may also include a set of permissions for accessing storage area 126 as well as the public key 118. In some implementations, this set of permissions may be defined by the user device 102 when the user device 102 requests the digital certificate. Details of how KMS 104 generates a digital certificate are described more fully in the description of FIG. 3 and not repeated herein for the sake of brevity. In some implementations, KMS 104 can also be configured to receive commands for accessing data in authorized client device 106 from the user device 102. For example, when the authorized client device 106 (or user device 102) wants to access data in storage area 126, the user device 102 or authorized client device 106 may generate a command representing this desire and send the command to the KMS 104. In response, the KMS 104 can use the KMS private key 110 to generate a digital signature of the command and return the digital signature to the user device 102 or authorized client device 106, respectively. In response, the user device 102 or authorized client device 106 can send the command signature storage device 108. Since the storage device 108 stores the KMS public key 128, the storage device 108 can validate the digital signature and since the KMS 104 can authenticate the user device 102, the storage device 108 can trust that the command was authorized by a valid user device 102.

The user device 102 is communicatively coupled to an authorized client device 106. As discussed, the authorized client device 106 may be a general-purpose computing device such as that depicted in FIG. 7 that is operated by a trusted or authorized third-party.

Authorized client device 106 includes an asymmetric key pair including a public key 118 and a private key 120. In some implementations, these keys can be generated locally by the authorized client device 106 using, for example, an RSA or ECDSA algorithm. In an implementation, a command line tool can be used to generate such a keypair (e.g., OpenSSH).

In another implementation, the authorized client device 106 optionally includes a physically unclonable function 122 (PUF). The physically unclonable function 122 may comprise a physical hardware circuit that exploits inherent randomness introduced during manufacturing to give a physical entity a unique "fingerprint" or trust anchor. In the illustrated embodiment, the physically unclonable function 122 produces a consistent and repeatable value. In some embodiments, the physically unclonable function 122 may comprise a static random-access memory (SRAM), Delay PUF, or any other PUF technology implemented by authorized client device 106. In an implementation, the authorized client device 106 can read a PUF value from physically unclonable function 122 and use the PUF value as a seed value during key generation. In some implementations, the private key 120 and public key 118 may be persistently stored. In other implementations, the private key 120 and public key 118 may not be persistently stored and may be regenerated as needed from the physically unclonable function 122 value. As will be illustrated, the private key 120 and public key 118 represent the cryptographic identity of authorized client device 106.

In some implementations, the controller 116 can provide the client public key 118 to the user device 102 in response to a request from the user device 102. The controller 116 may also receive a digital certificate from the user device 102 (generated by certificate generator 114) for accessing storage device 108. The controller 116 can generate commands to access data in storage area 126. In one implementation, controller 116 can sign these commands using private key 120 while in others the command may be signed using KMS private key 110 in addition to the private key 120. The controller 116 may also perform secure operations on data returned by storage device 108. In some implementations, the authorized client device 106 can comprise a TEE, HSM, Secure Enclave, or similar environment to perform such operations. As such, operations on the data can be protected from outside devices. Details of these operations are provided in more detail herein and, in particular, the description of FIG. 4.

Storage device 108 is communicatively coupled to authorized client device 106 and user device 102. Storage device 108 includes a controller 124 that handles incoming commands including validation and execution thereon. The storage device 108 includes a KMS public key 128 that corresponds to KMS private key 110. In some implementations, KMS public key 128 may be written to storage device 108 during manufacturing of the storage device 108. In some implementations, KMS public key 128 can be stored in a write-protected region of the storage device 108. The storage device 108 can also store one or more public keys 130 and digital certificates 132 that are associated with trusted devices. Details on how these keys and digital certificates are written are described further herein. Finally, the storage device 108 may store a set of permissions 134. In an implementation, the set of permissions 134 can include sets of permissions associated with each public key and digital certificate. In an implementation, the controller 124 can receive a digital certificate that includes a public key and set of permissions and can update the set of permissions 134, one or more public keys 130, and digital certificates 132 after validating the digital certificate using the KMS public key 128. Then, when receiving a command to access data stored in storage area 126, the controller 124 can validate the command using one or more of the KMS public key 128 and one of the one or more public keys 130 to determine that the command is valid before returning data or otherwise operating on storage area 126. Details of the operations of storage device 108 are provided in more detail in the description of FIG. 5.

Figure 2:
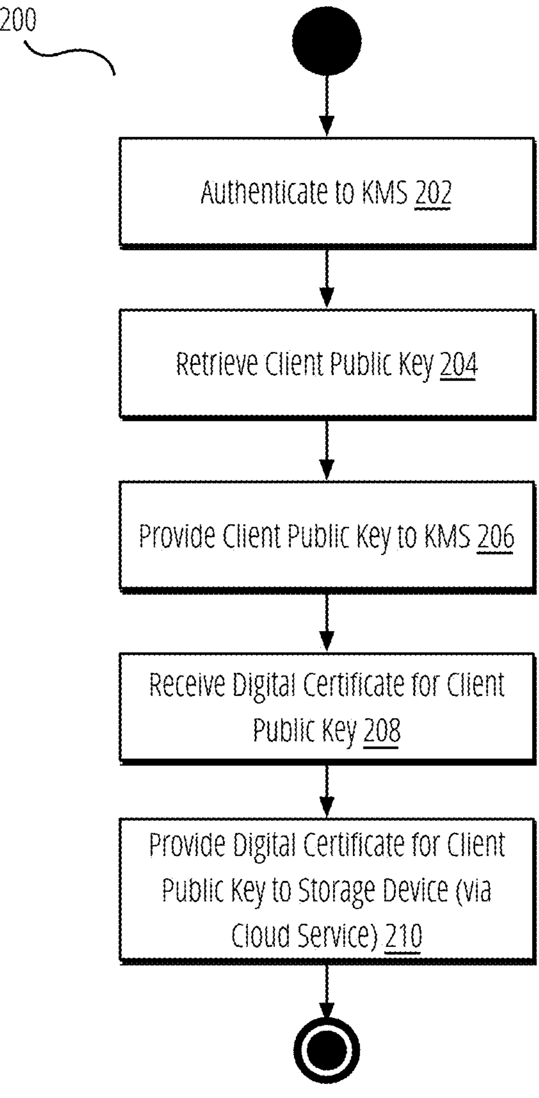
FIG. 2 is a flow diagram illustrating a method for enabling operations on a cloud storage device.

FIG. 2 is a flow diagram illustrating a method for enabling operations on a cloud storage device.

In step 202, method 200 can include a user device authenticating to a key management server.

In some implementations, the KMS may store a set of user accounts or credentials. In such implementations, a user may provide their identifying data (e.g., username, user ID, email address, etc.) and a password which the KMS can validate and authenticate the user. In other implementations, mTLS can be used to authenticate with a KMS. As discussed in FIG. 1, the KMS can include software or circuitry to generate digital certificates and can include asymmetric key pairs to enable this process.

In step 204, method 200 can include retrieving a client device public key.

In some implementations, the client device public key can be generated by a computing device that a user of a cloud storage device wants to allow access to data stored on the cloud storage device. Thus, in some implementations, a user device can issue a request to the client device for the client device public key. Although one client device public key is discussed in method 200, method 200 can be extended to operate on multiple client device public keys (e.g., for multiple clients or for multiple public keys per client) simultaneously. In another implementation, the user device may already hold the client device public key and may thus not need to request the client device public key from the client device. For example, the user device may cache the client device public key as part of other operations. As discussed previously, the client device public key may be a public key portion of an asymmetric key such as an RSA or ECDSA key pair generated by the client device. In some implementations, this asymmetric key pair can be derived from a PUF and thus unique to the client device.

In step 206, method 200 can include providing the client device public key to the KMS.

In some implementations, method 200 can include issuing a network request to the KMS that includes the client device public key. As discussed in step 202, the user device may authenticate with the KMS in advance and thus a session can be created to allow the user device to simply upload the client device public key to a designated endpoint. As will be discussed in FIG. 3, this endpoint can trigger the KMS to generate a digital certificate that includes the client device public key. In some implementations, step 206 can also include providing a set of permissions to the KMS along with the client device public key. For example, the set of permissions can specify a write permission, read permission, or read/write permission. Various other types of permissions supported by a storage device may also be included.

In step 208, method 200 can include receiving a digital certificate for the client device public key from the KMS.

In some implementations, the digital certificate can be an X.509 digital certificate. In some implementations, the digital certificate can include the client device public key as the Subject Key in the Subject Public Key Info field of the X.509 digital certificate. Any well-known digital certificate format or generation process may be used and X.509 is not intended to be limiting. To secure the digital certificate, the KMS may sign the digital certificate using its own KMS private key and include the digital signature in the digital certificate. Finally, the KMS returns the digital certificate as a response to the network request and the user device can receive this digital certificate to use in later processes (described herein).

In step 210, method 200 can include providing the digital certificate to the cloud storage device for later use. Details of this step are described in more detail, from the perspective of the storage device in FIG. 5. In general, the user device can upload the digital certificate to the cloud service for distribution to the appropriate cloud storage device. In some implementations, the cloud service can issue a command to the storage device to save the digital certificate. In some implementations, this command can provision the storage device to allow the client device associated with the client device public key to access the storage device in response to future commands. In some embodiments, the KMS may return the digital certificate directly to the cloud storage device. For example, in step 206, the user can provide an identifier of the cloud storage device to the KMS and the KMS can use this identifier to transmit the digital certificate directly to the cloud storage device.

Figure 3:
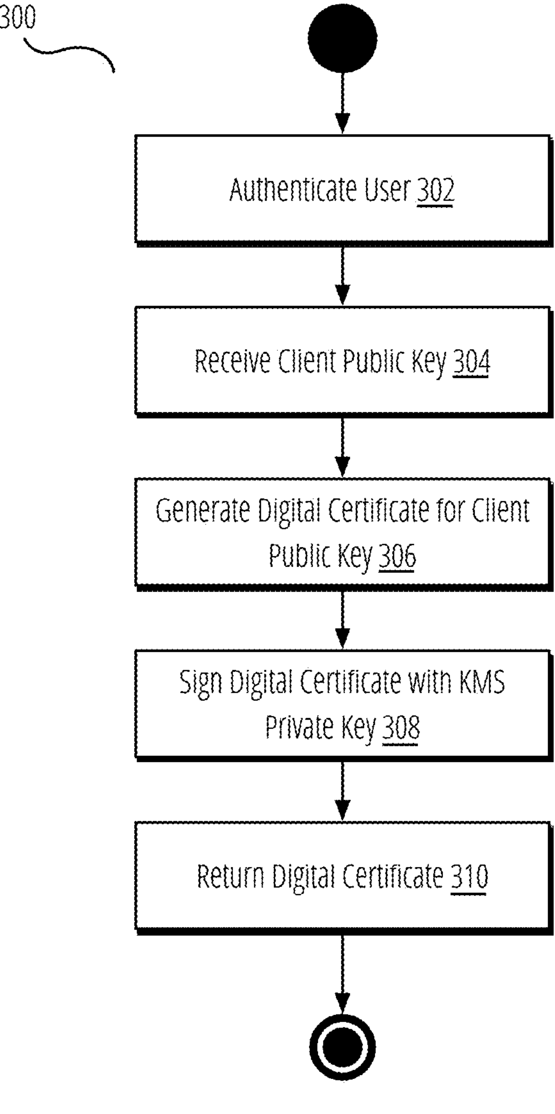
FIG. 3 is a flow diagram illustrating a method for generating a digital certificate.

FIG. 3 is a flow diagram illustrating a method for generating a digital certificate.

In step 302, method 300 can include authenticating a user. Specific details on a KMS authenticating a user device were provided in the description of step 202 and are not repeated herein for the sake of brevity.

In step 304, after method 300 authenticates the user, method 300 can include receiving the public key of a to-be-authorized client device. In general, this client device public key corresponds to the client device public key transmitted in steps 204 and 206 of FIG. 2 and that disclosure is incorporated herein its entirety.

In step 306, method 300 can include generating a digital certificate for the client device public key and, in step 308, method 300 can include signing the digital certificate with a KMS private key.

As discussed, in some implementations, the digital certificate can be an X.509-formatted digital certificate. In some implementations, the digital certificate can include the client device public key as the Subject Public Key in the Subject Public Key Info field of an X.509 certificate. In some implementations, as part of step 304 (or as a separate step), method 300 may receive a set of permissions. For example, the set of permissions can specify whether an owner of the client device public key can read, write, read and write, erase, etc. data stored by a storage device. In some implementations, these permissions can be included in the X.509 certificate. In some implementations, these permissions can be stored as, for example, a bitstring either in a common field or in an extension of the X.509 certificate. Finally, after generating the digital certificate, step 306 can include signing the digital certificate using a KMS private key held by method 300. Since the client device public key and permissions are signed by the KMS private key they are tamper-proof and can reliably set permissions for a specific device as will be discussed.

In step 310, method 300 can include returning the digital certificate to the user device that sent the client device public key. As discussed, the digital certificate may be returned as a response to a network request.

In the illustrated methods (method 200 and method 300), a KMS and a user device establish trust as to the identity of the user device (e.g., via user identifiers or mTLS). Then, the user device provides a public key (of a client device) to the KMS and a set of permissions. The KMS can then act as an authority and generate a digital certificate that allows an authorized owner of the public key to access a storage device that includes the KMS public key. As will be discussed, the user device can then provision one or more storage devices with this digital certificate and then a client device can issue commands to the storage device.

Figure 4:
FIG. 4 is a flow diagram illustrating a method for accessing a storage device by an authorized client.
Figure 4:
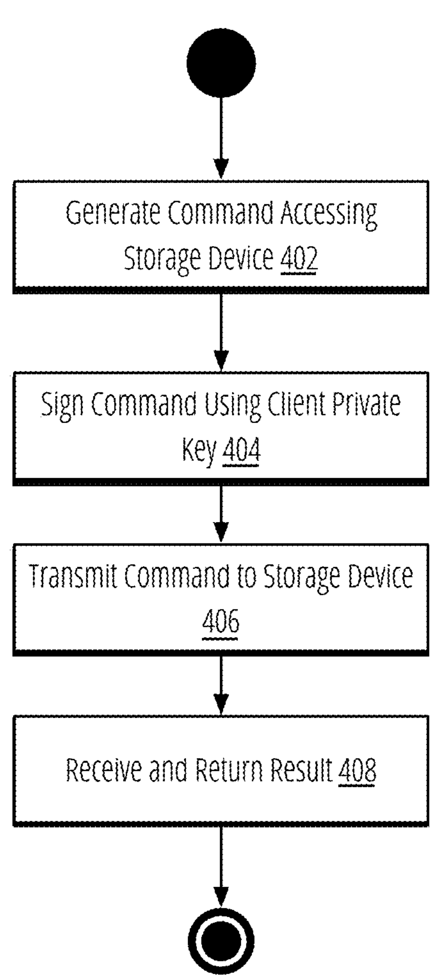

FIG. 4 is a flow diagram illustrating a method for accessing a storage device by an authorized client.

In step 402, method 400 can include generating a command to access a storage device. In an implementation, the command can include, for example, a command to read data from such a storage device or write data to a storage device. Other types of commands supported by a storage device may also be generated. In an implementation, an authorized client device (e.g., one authorized using the foregoing methods) generates the command in step 402. In some implementations, the command can include a low-level command to access particular memory locations of the storage device. In other implementations, the command can include a high-level command accessing, for example, files or directories stored by the storage device.

In step 404, method 400 can include signing the command using a private key. In some implementations, one or both of the following implementations may be implemented as part of step 404.

In a first implementation, step 404 can include a client device signing the command using its own private key. Specifically, client device can sign the command using the private key corresponding to a public key stored by the storage device using the methods described herein. In a second implementation, step 404 can include a client device transmitting the command to a KMS and the KMS signing the command using its own KMS private key. In such an implementation, the client device can authenticate its request using its own private key (e.g., via mTLS or a similar type of protocol) without requiring that the client device maintain an account with the KMS. For instance, the KMS can cache the client's public key when it receives it (as part of step 304) and then the client device can provide a certificate of its identity to allow the KMS to load the corresponding public key to verify a signature of the client device. In a third implementation, both signatures may be used. That is, the client device may first sign the command using its own private key and then provide the command and signature to the KMS for signing using the KMS private key.

In step 406, method 400 can include transmitting the command to the storage device. In some implementations, step 408 can include transmitting the signed command to the storage device over an interface such as a network or a bus. After transmitting the command, the client device will await a response from the storage device.

In step 408, method 400 can include receiving a response to the command. The response to the command may necessarily depend on the type of command. For example, a read command will return data stored by the storage device while a write command may return a return status of the command. In response to the response from the storage device, the client device may perform operations on the returned data. Specifically, the client device may execute any operations within a secure environment (e.g., TEE, HSM, Secure Enclave, etc.), thus ensuring data privacy during such operations. Ultimately, method 400 may then further include returning the results of its processing to the user device (for example, if the user device delegated processing to the client device). In some implementations, this return result can be the data itself returned from the storage device or can be the results of further processing performed by the client device.

Figure 5:
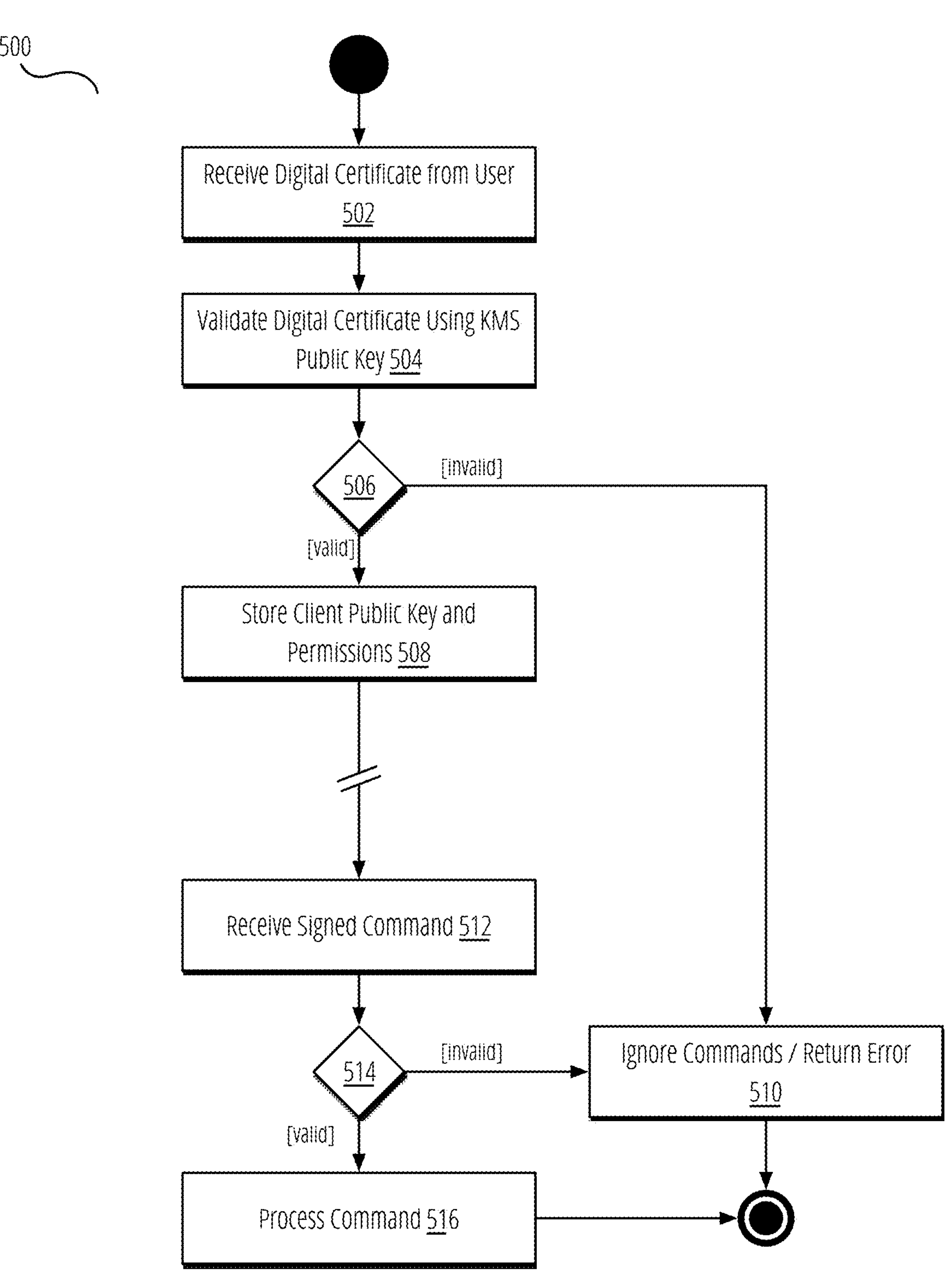
FIG. 5 is a flow diagram for provisioning a storage device and processing commands accessing the storage device.

FIG. 5 is a flow diagram for provisioning a storage device and processing commands accessing the storage device.

In step 502, method 500 can include receiving a digital certificate from a user. The digital certificate received in step 502 corresponds to that returned in step 310 of FIG. 3 and that description is not repeated herein. In brief, the digital certificate may be generated by a KMS and include the client device's public key in the Subject Public Key Info field. The digital certificate may be signed using the private key of the KMS and returned to the user device. The user device can then transmit the digital certificate to the storage device. In some implementations, a cloud network operator's infrastructure can provide an external endpoint to allow a user device to identify a cloud storage device and transmit the digital certificate for persisting in the cloud storage device.

In step 504, method 500 can include validating the digital certificate and in step 506, method 500 can branch depending on the validation result. In some implementations, this validation procedure can include reading a KMS public key from a secure storage area (e.g., write-protected area) of the storage device. The procedure can then include hashing the command to generate a first hash and decrypting a digital signature of the digital certificate using the KMS public key to generate a second hash. If the first hash and the second hash match, method 500 can validate the digital certificate and proceed to step 508. Otherwise, method 500 can discard the digital certificate and ignore future commands in step 510. In some implementations, step 510 can further include returning an error result to the user device.

If method 500 can validate the digital certificate, method 500 can be certain that the digital certificate was generated by a KMS. Further, since the KMS authenticates a user device prior to issuing the digital certificate, method 500 can assume that a valid user has transmitted the digital certificate. Further, in some implementations, a cloud network operator can validate the identity of the user via user credentials, mTLS, or a similar mechanism. Next, in step 508, method 500 can include storing the client device public key in the digital certificate and any permissions in the digital certificate. As discussed above, the digital certificate may comprise an X.509 certificate. This certificate includes the client device public key as the Subject Public Key Info field and may include a set of permissions in a common or extension field. Method 500 can extract both these values from the digital certificate and store these values for use when processing future commands.

After a period of time (indicated by the broken line), in step 512, method 500 can receive a signed command and in step 514 can validate this signed command. In some implementations, the signature of the command can be generated using the private key of the client device. In some implementations, this private key must correspond to the public key stored in step 508 for method 500 to continue. Thus, only the client device (the holder of the private key) can issue commands to method 500 (although a user device may always be authorized to issue commands due to its ownership of the storage device). As discussed previously, the command can include any command accessing data managed by the storage device. As discussed in FIG. 4, alternatively, or in conjunction with the foregoing, the signed command can also include a second signature generated by the KMS. In this implementation, the KMS can sign the command (which includes the client-generated signature) with its own KMS private key. Then, method 500 can then first validate the first signature (using the client device public key) and then validate the second signature using the KMS public key. If any digital signature validations fail, method 500 can ignore the command in step 510 and return an error.

In some implementations, step 514 can also include checking one or more permissions of the command. As discussed in step 508, method 500 can store a set of permissions associated with a client device public key. In step 514, method 500 can load these permissions by using the client device public key used to decrypt the digital signature and comparing the requested operation in the command to a set of allowed operations (i.e., permissions). If the operation is not allowed based on the set of permissions, method 500 proceeds to step 510 to ignore the command. Alternatively, if the operation is permitted, method 500 proceeds to step 516.

By contrast, if the digital signature validations pass, method 500 can proceed to step 516 and process the command. As discussed, the command may be a read, write, erase, etc. command that modifies or otherwise accesses data stored in a storage array of the storage device. The specific type of command is not limiting and any command that can be issued to a storage device can be used. After executing the command, method 500 can include returning the results of the operation to the client device that issued the command (as discussed in FIG. 4).

In some implementations, method 500 can also include continuously checking the validity of the digital certificate. In some implementations, the digital certificate can include a validity period that defines how long the digital certificate is valid. Method 500 can monitor this validity period and remove the digital certificate (and corresponding client device public key and permissions) when the digital certificate expires. Since the digital certificate usually has a short valid period, a malicious party cannot replay the data handling after the user finishes the data handling because the digital certificate will already expire, and the access will be denied by storage when the digital certificate is removed after expiration.

In the foregoing methods, a KMS and user device operate to authorize a client device to operate on data stored by a storage device. Further, by relying on digital certificates of client devices, a user can authorize multiple client devices to access a storage device. As such, a user device can delegate authority to multiple client devices.

Figure 6:
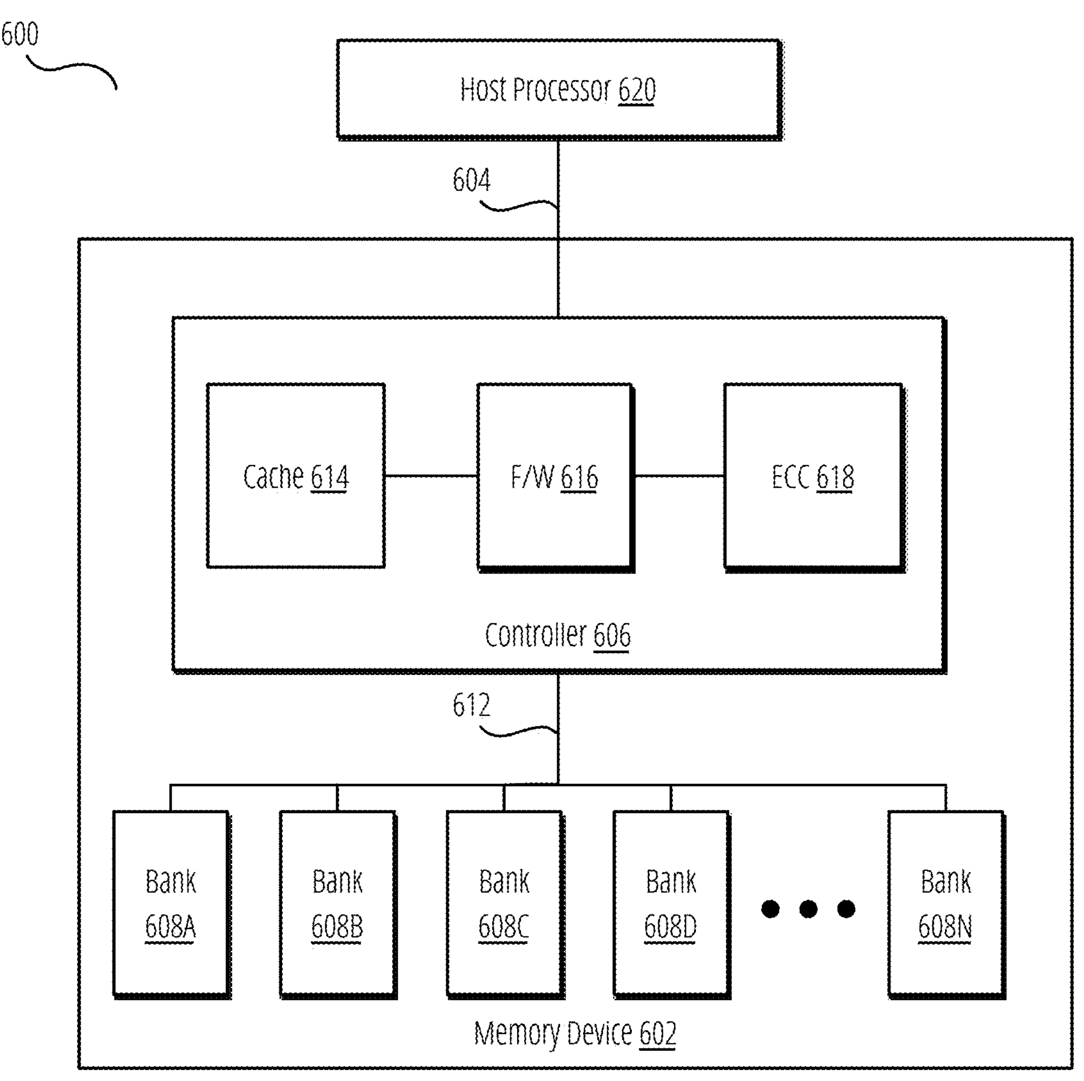
FIG. 6 is a block diagram illustrating a computing system according to some embodiments of the disclosure.

FIG. 6 is a block diagram illustrating a computing system according to some embodiments of the disclosure.

As illustrated in FIG. 6, a computing system 600 includes a host processor 620 communicatively coupled to a memory device 602 via a bus 604. The memory device 602 comprises a controller 606 communicatively coupled to one or more memory banks (e.g., bank 608A, bank 608B, bank 608C, bank 608D, bank 608N, etc.) forming a memory array via an interface 612. As illustrated, the controller 606 includes a local cache 614, firmware 616, and an ECC module 618.

In the illustrated embodiment, host processor 620 can comprise any type of computer processors, such as a central processing unit (CPU), graphics processing unit (GPU), or other types of general-purpose or special-purpose computing devices. The host processor 620 includes one or more output ports that allow for the transmission of address, user, and control data between the host processor 620 and the memory device 602. In the illustrated embodiment, this communication is performed over bus 604. In one embodiment, the bus 604 comprises an input/output (I/O) bus or a similar type of bus.

The memory device 602 is responsible for managing one or more memory banks (e.g., bank 608A, bank 608B, bank 608C, bank 608D, bank 608N, etc.). In one embodiment, the memory banks (e.g., bank 608A, bank 608B, bank 608C, bank 608D, bank 608N, etc.) comprise NAND Flash dies or other configurations of non-volatile memory. In one embodiment, the memory banks (e.g., bank 608A, bank 608B, bank 608C, bank 608D, bank 608N, etc.) comprise a memory array.

The memory banks (e.g., bank 608A, bank 608B, bank 608C, bank 608D, bank 608N, etc.) are managed by the controller 606. In some embodiments, the controller 606 comprises a computing device configured to mediate access to and from banks (e.g., bank 608A, bank 608B, bank 608C, bank 608D, bank 608N, etc.). In one embodiment, the controller 606 comprises an ASIC or other circuitry installed on a printed circuit board housing the memory banks (e.g., bank 608A, bank 608B, bank 608C, bank 608D, bank 608N, etc.). In some embodiments, the controller 606 may be physically separate from the memory banks (e.g., bank 608A, bank 608B, bank 608C, bank 608D, bank 608N, etc.). The controller 606 communicates with the memory banks (e.g., bank 608A, bank 608B, bank 608C, bank 608D, bank 608N, etc.) over the interface 612. In some embodiments, this interface 612 comprises a physically wired (e.g., traced) interface. In other embodiments, interface 612 comprises a standard bus for communicating with memory banks (e.g., bank 608A, bank 608B, bank 608C, bank 608D, bank 608N, etc.).

The controller 606 comprises various modules, including local cache 614, firmware 616, and ECC module 618. In one embodiment, the various modules (e.g., local cache 614, firmware 616, and ECC module 618) comprise various physically distinct modules or circuits. In other embodiments, the modules (e.g., local cache 614, firmware 616, and ECC module 618) may completely (or partially) be implemented in software or firmware.

As illustrated, firmware 616 comprises the core of the controller and manages all operations of the controller 606. The firmware 616 may implement some or all of the methods described above. Specifically, firmware 616 may implement the methods described in the foregoing figures.

FIG. 7 is a block diagram of a computing device according to some embodiments of the disclosure.

As illustrated, the device 700 includes a processor or central processing unit (CPU) such as CPU 702 in communication with a memory 704 via a bus 714. The device also includes one or more input/output (I/O) or peripheral devices 712. Examples of peripheral devices include, but are not limited to, network interfaces, audio interfaces, display devices, keypads, mice, keyboards, touch screens, illuminators, haptic interfaces, global positioning system (GPS) receivers, cameras, or other optical, thermal, or electromagnetic sensors.

In some embodiments, the CPU 702 may comprise a general-purpose CPU. The CPU 702 may comprise a single-core or multiple-core CPU. The CPU 702 may comprise a system-on-a-chip (SoC) or a similar embedded system. In some embodiments, a graphics processing unit (GPU) may be used in place of, or in combination with, a CPU 702. Memory 704 may comprise a memory system including a dynamic random-access memory (DRAM), static random-access memory (SRAM), Flash (e.g., NAND Flash), or combinations thereof. In one embodiment, the bus 714 may comprise a Peripheral Component Interconnect Express (PCIe) bus. In some embodiments, bus 714 may comprise multiple busses instead of a single bus.

Memory 704 illustrates an example of a non-transitory computer storage media for the storage of information such as computer-readable instructions, data structures, program modules, or other data. Memory 704 can store a basic input/output system (BIOS) in read-only memory (ROM), such as ROM 708, for controlling the low-level operation of the device. The memory can also store an operating system in random-access memory (RAM) for controlling the operation of the device.

Applications 710 may include computer-executable instructions that, when executed by the device, perform any of the methods (or portions of the methods) described previously in the description of the preceding figures. In some embodiments, the software or programs implementing the method embodiments can be read from a hard disk drive (not illustrated) and temporarily stored in RAM 706 by CPU 702. CPU 702 may then read the software or data from RAM 706, process them, and store them in RAM 706 again.

The device may optionally communicate with a base station (not shown) or directly with another computing device. One or more network interfaces in peripheral devices 712 are sometimes referred to as a transceiver, transceiving device, or network interface card (NIC).

An audio interface in peripheral devices 712 produces and receives audio signals such as the sound of a human voice. For example, an audio interface may be coupled to a speaker and microphone (not shown) to enable telecommunication with others or generate an audio acknowledgment for some action. Displays in peripheral devices 712 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 712 may comprise any input device arranged to receive input from a user. An illuminator in peripheral devices 712 may provide a status indication or provide light. The device can also comprise an input/output interface in peripheral devices 712 for communication with external devices, using communication technologies, such as USB, infrared, Bluetooth®, or the like. A haptic interface in peripheral devices 712 provides tactile feedback to a user of the client device.

A GPS receiver in peripheral devices 712 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 7, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment, and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on the context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of order. For example, two blocks shown in succession can, in fact, be executed substantially concurrently, or the blocks can sometimes be executed in the reverse order, depending upon the functionality or acts involved.

These computer program instructions can be provided to a processor of a general purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure, a computer-readable medium (or computer-readable storage medium) stores computer data, which data can include computer program code or instructions that are executable by a computer, in machine-readable form. By way of example and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage, or other magnetic storage devices, or any other physical or material medium which can be used to tangibly store the desired information or data or instructions and which can be accessed by a computer or processor.

For the purposes of this disclosure, a module is a software, hardware, or firmware (or combinations thereof) system, process or functionality, or component thereof that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and, as such, are not to be limited by the foregoing exemplary embodiments and examples. In other words, functional elements being performed by single or multiple components, in various combinations of hardware and software or firmware, and individual functions, may be distributed among software applications at either the client level or server level, or both. In this regard, any number of the features of the different embodiments described herein may be combined into single or multiple embodiments, and alternate embodiments having fewer than or more than all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions, and interfaces, as well as those variations and modifications that may be made to the hardware, software, or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:

obtaining, by a user device having ownership of a storage device of a cloud service and from a client device to be authorized by the user device to access the storage device, a public key of the client device;

transmitting, by the user device, the public key of the client device to a key management server (KMS);

generating, by the KMS, a digital certificate using the public key of the client device;

storing, by the user device, the digital certificate into the storage device of the cloud service to provide the client device with access to data stored in the storage device;

receiving, in the storage device and from the client device, a signed command to access the data in the storage device, wherein the signed command is signed by the client device using a private key corresponding to the public key of the client device; and validating, by the storage device, the signed command using the public key included in the digital certificate stored by the user device.

2. The method of claim 1, wherein generating the digital certificate using the public key of the client device comprises generating, by the KMS, the digital certificate by using the public key of the client device as a Subject Public Key and signing the digital certificate using a KMS private key.

3. The method of claim 2, wherein storing the digital certificate in the storage device of the cloud service comprises:

reading, by the storage device, a KMS public key stored in a write-protected region of the storage device;

validating, by the storage device, the digital certificate using the KMS public key; and writing the public key of the client device to the write-protected region.

4. The method of claim 1, wherein storing the digital certificate in a storage device of a cloud service further comprises setting at least one access permission based on the digital certificate.

5. The method of claim 1, wherein the digital certificate includes a validity period and the method further comprises removing the digital certificate when the validity period expires.

6. The method of claim 1, further comprising receiving, by the storage device, the signed command and validating the signed command by validating a digital signature included in the signed command using a public key included in the digital certificate.

7. The method of claim 6, further comprising:

returning, by the storage device, data responsive to the signed command; and processing, by the client device, the data.

8. A non-transitory computer-readable storage medium for tangibly storing computer program instructions which, when executed by a computer processor, cause the computer processor to perform a method, comprising obtaining, by a user device having ownership of a storage device of a cloud service and from a client device to be authorized by the user device to access the storage device, a public key of the client device;

transmitting, by the user device, the public key of the client device to a key management server (KMS);

generating, by the KMS, a digital certificate using the public key of the client device;

storing, by the user device, the digital certificate into the storage device of cloud service to provide the client device with access to data stored in the storage device;

receiving, in the storage device and from the client device, a signed command to access the data in the storage device, wherein the signed command signed by the client device using a private key corresponding to the public key of the client device; and validating, by the storage device, the signed command using the public key included in the digital certificate stored by the user device.

9. The non-transitory computer-readable storage medium of claim 8, wherein generating the digital certificate using the public key of the client device comprises generating, by the KMS, the digital certificate by using the public key of the client device as a Subject Public Key and signing the digital certificate using a KMS private key.

10. The non-transitory computer-readable storage medium of claim 9, wherein storing the digital certificate in the storage device of the cloud service comprises:

reading, by the storage device, a KMS public key stored in a write-protected region of the storage device;

validating, by the storage device, the digital certificate using the KMS public key; and writing the public key of the client device to the write-protected region.

11. The non-transitory computer-readable storage medium of claim 8, wherein storing the digital certificate in a storage device of a cloud service further comprises setting at least one access permission based on the digital certificate.

12. The non-transitory computer-readable storage medium of claim 8, wherein the digital certificate includes a validity period and the method further comprises removing the digital certificate when the validity period expires.

13. The non-transitory computer-readable storage medium of claim 8, further comprising receiving, by the storage device, the signed command and validating the signed command by validating a digital signature included in the signed command using a public key included in the digital certificate.

14. The non-transitory computer-readable storage medium of claim 13, the method further comprising:

returning, by the storage device, data responsive to the signed command; and processing, by the client device, the data.

15. A system comprising:

a key management server (KMS);

a storage device of a cloud service; and a user device, the user device having ownership of the storage device;

wherein the user device is configured to:

obtain, from a client device to be authorized by the user device to access the storage device, a public key of the client device;

transmit the public key of the client device to the KMS, the KMS configured to generate a digital certificate using the public key of the client device in response to the public key of the client device, and store the digital certificate into the storage device of the cloud service to provide the client device with access to data stored in the storage device;

wherein the client device is configured to; and receive, from the client device, a signed command to access the data in the storage device, wherein the signed command is signed using a private key corresponding to the public key of the client device; and validate the signed command using the public key included in the digital certificate stored by the user device.

16. The system of claim 15, the KMS is further configured to generate the digital certificate by using the public key of the client device as a Subject Public Key and signing the digital certificate using a KMS private key.

17. The system of claim 16, wherein the storage device is further configured to:

read a KMS public key stored in a write-protected region of the storage device;

validate the digital certificate using the KMS public key; and write the public key of the client device to the write-protected region.

18. The system of claim 15, wherein the storage device is further configured to set at least one access permission based on the digital certificate.

19. The system of claim 15, wherein the digital certificate includes a validity period and the storage device is further configured to remove the digital certificate when the validity period expires.

20. The system of claim 15, wherein the storage device is further configured to receive the signed command and validate the signed command by validating a digital signature included in the signed command using a public key included in the digital certificate.

* * * * *